(12) United States Patent
Vaswani et al.

(10) Patent No.: US 6,308,275 B1
(45) Date of Patent: Oct. 23, 2001

(54) WEB HOST PROVIDING FOR SECURE EXECUTION OF CGI PROGRAMS AND METHOD OF DOING THE SAME

(75) Inventors: Rajendra Vaswani, San Jose; Eric Y. W. Ho, Sunnyvale, both of CA (US)

(73) Assignee: At Home Corporation, Redwood City, CA (US)

(*) Notice: Subject to any disclaimer, the term of this patent is extended or adjusted under 35 U.S.C. 154(b) by 0 days.

(21) Appl. No.: 09/113,598

(22) Filed: Jul. 10, 1998

(51) Int. Cl.$^7$ ........................................ G06F 11/30
(52) U.S. Cl. ............................... 713/201; 713/202
(58) Field of Search ................... 713/200, 201, 713/202

(56) References Cited

U.S. PATENT DOCUMENTS

| | | | |
|---|---|---|---|
| 5,805,803 | * 9/1998 | Birrell et al. | 395/187.01 |
| 5,870,544 | * 2/1999 | Curtis | 395/187.01 |
| 5,872,915 | * 2/1999 | Dykes et al. | 395/188.01 |
| 5,892,905 | * 4/1999 | Brandt et al. | 395/187.01 |
| 5,908,469 | * 6/1999 | Botz et al. | 713/201 |
| 5,987,611 | * 11/1999 | Freund | 713/201 |
| 5,991,810 | * 11/1999 | Shapiro et al. | 709/229 |
| 6,018,801 | * 1/2000 | Palage et al. | 713/201 |
| 6,073,241 | * 6/2000 | Rosenberg et al. | 713/201 |

OTHER PUBLICATIONS

Apache HTTP Server Version 1.3 Manual; Apache suEXEC Support; Undated; pp. 1–8.
Apache HTTP Server Version 1.2 Manual; Apache suEXEC Support; Undated; pp. 1–8.
Apache HTTP Server Version 1.2 Manual; Security Tips for Server Configuration; Undated; pp. 1–3.

* cited by examiner

Primary Examiner—Norman M. Wright
(74) Attorney, Agent, or Firm—Fenwick & West LLP

(57) ABSTRACT

A web host includes a web server that provides web pages to a client. In response to a particular web page, the client sends a request to the web server to execute a CGI program stored on the web server. A redirector within the web server redirects the CGI execution request to a CGI proxy, which determines the execution mode in which the CGI program is executed. To make this determination, the CGI proxy first checks if the requested program requires authentication, and next if it belongs to a list of "special" CGI programs meant to be executed with different "safety" modes. Each CGI program in such a list corresponds to an execution mode with particular security privileges—e.g., being able to read or write to a file the user otherwise could not read or modify. If authentication is required but fails, the CGI proxy executes the requested program in a "safety" mode, according very limited privileges to the invoked program. If authentication is required and succeeds, the CGI proxy checks the requested program name against the list of "special" programs. If the program is in this list, the proxy executes it with a mode appropriate to the program; otherwise, it executes the program under the requesting user's identification. If authentication is not required at all, the CGI proxy checks the requested program name against the list of "special" programs, and then executes the program either with the appropriate mode or under the requesting user's identification.

23 Claims, 5 Drawing Sheets

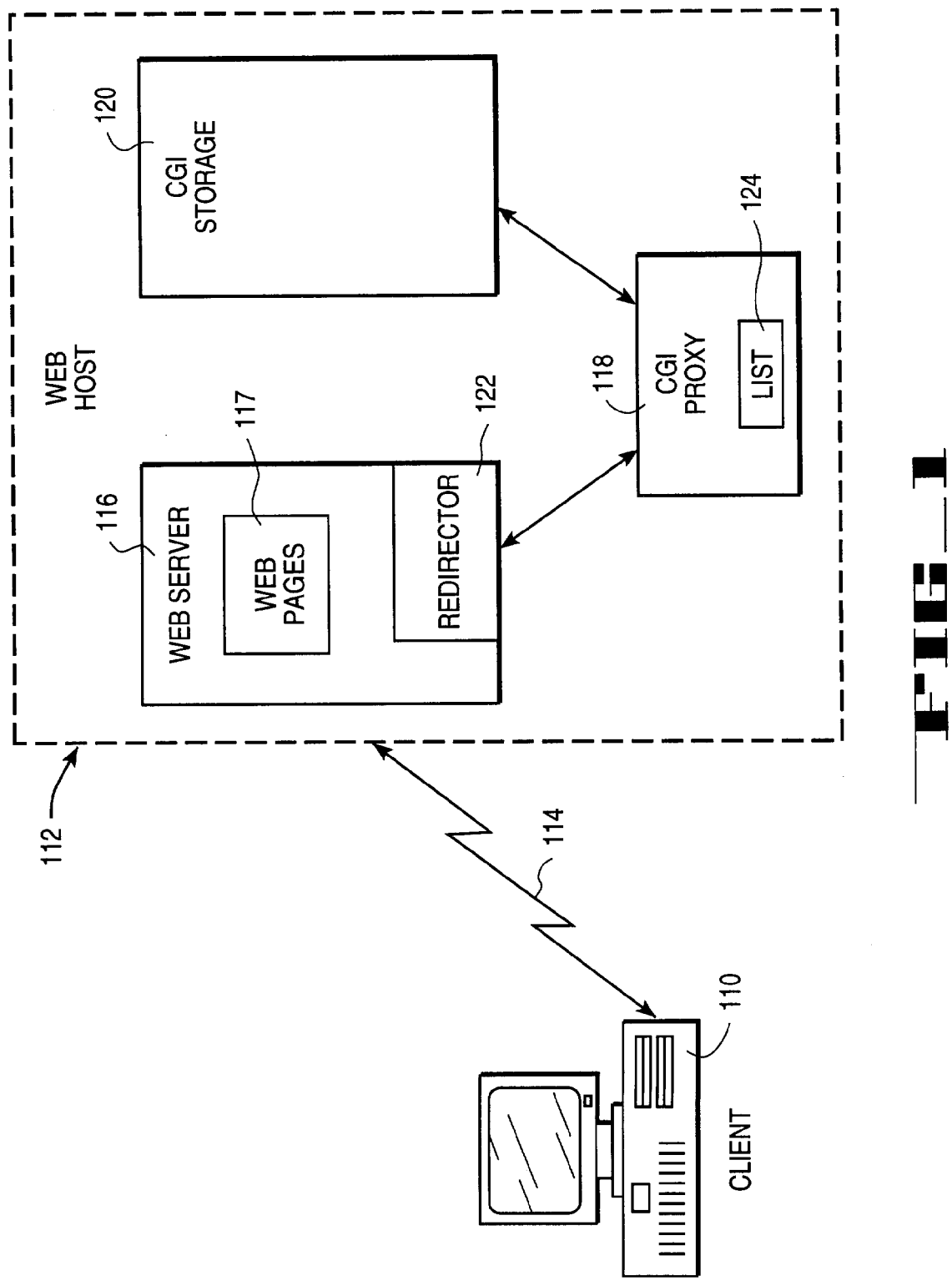
FIG_1

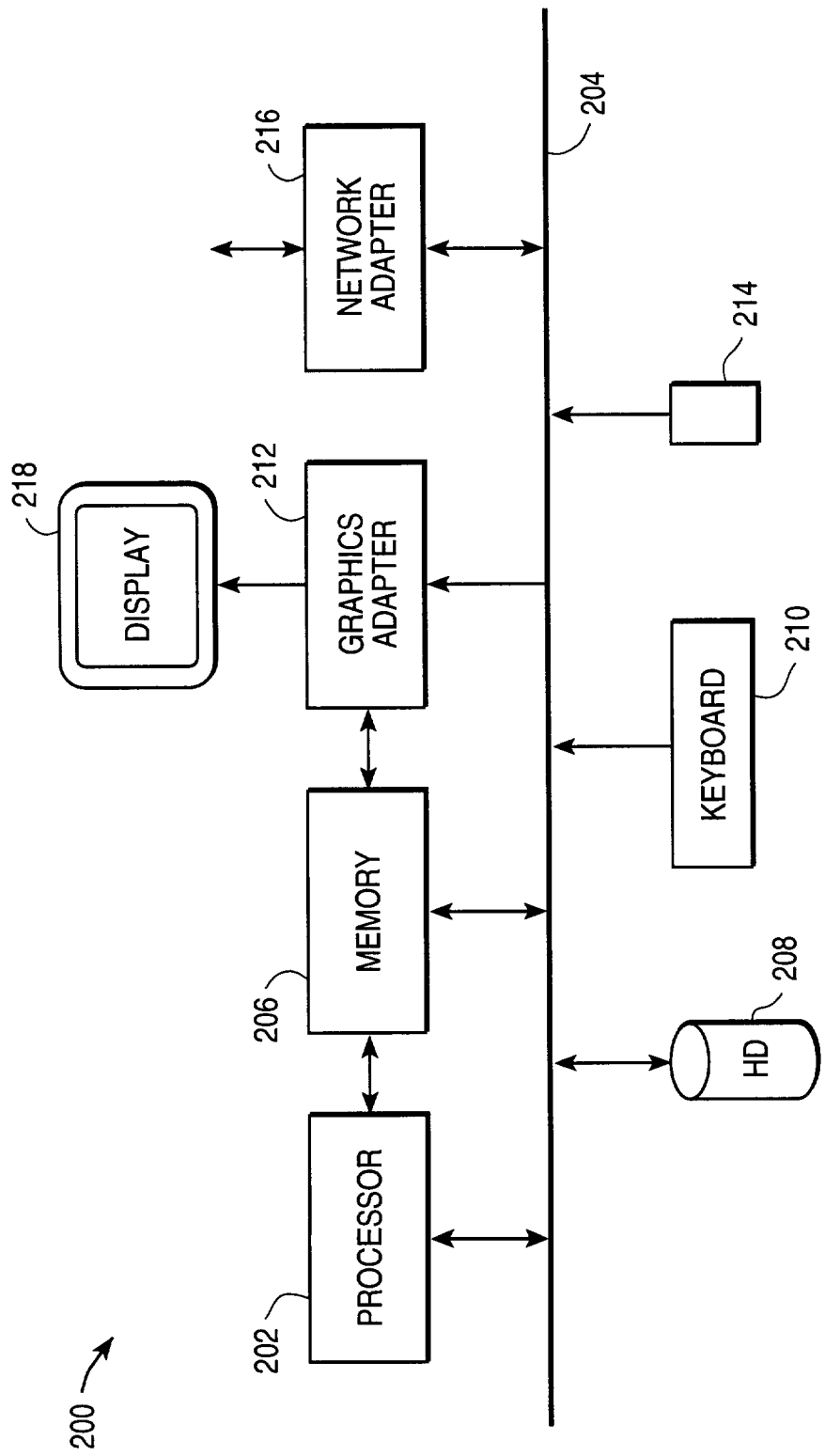
FIG_2

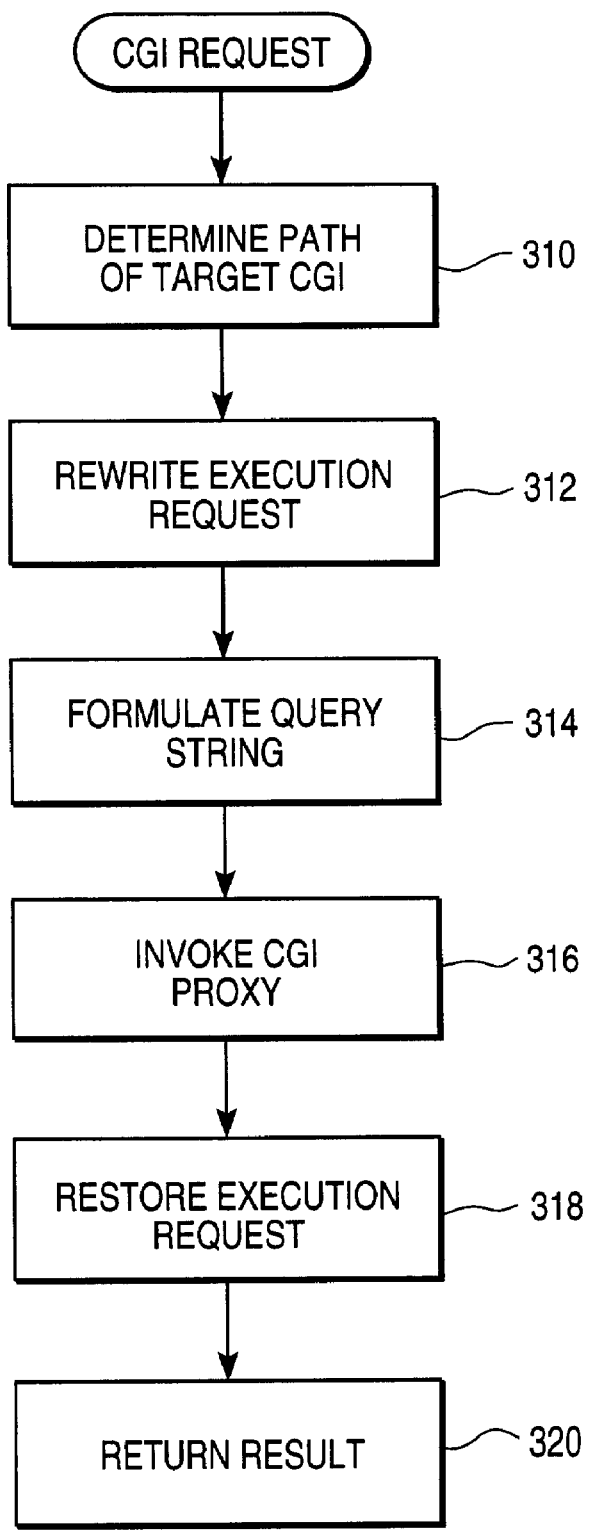
FIG_3

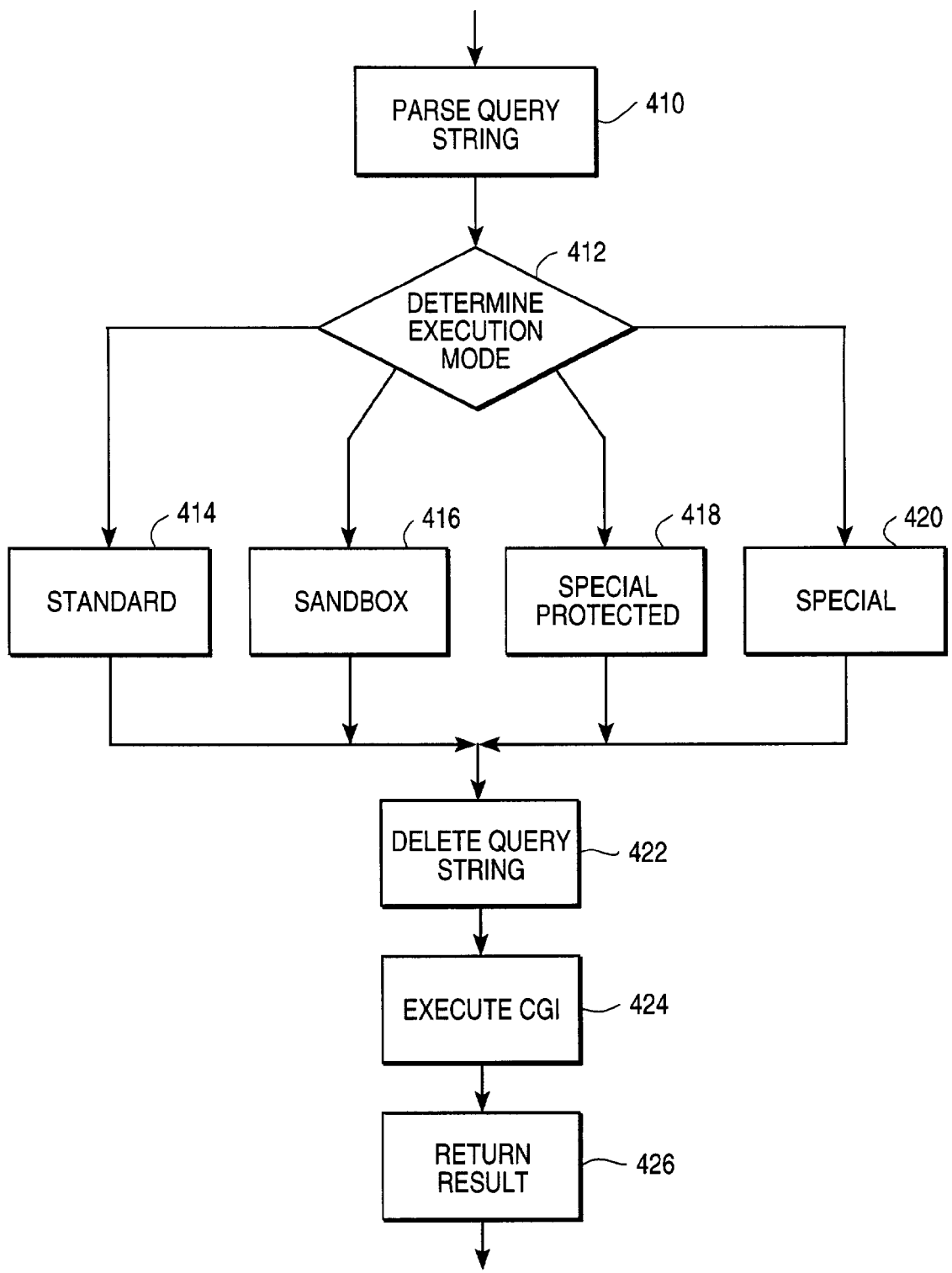
FIG_4

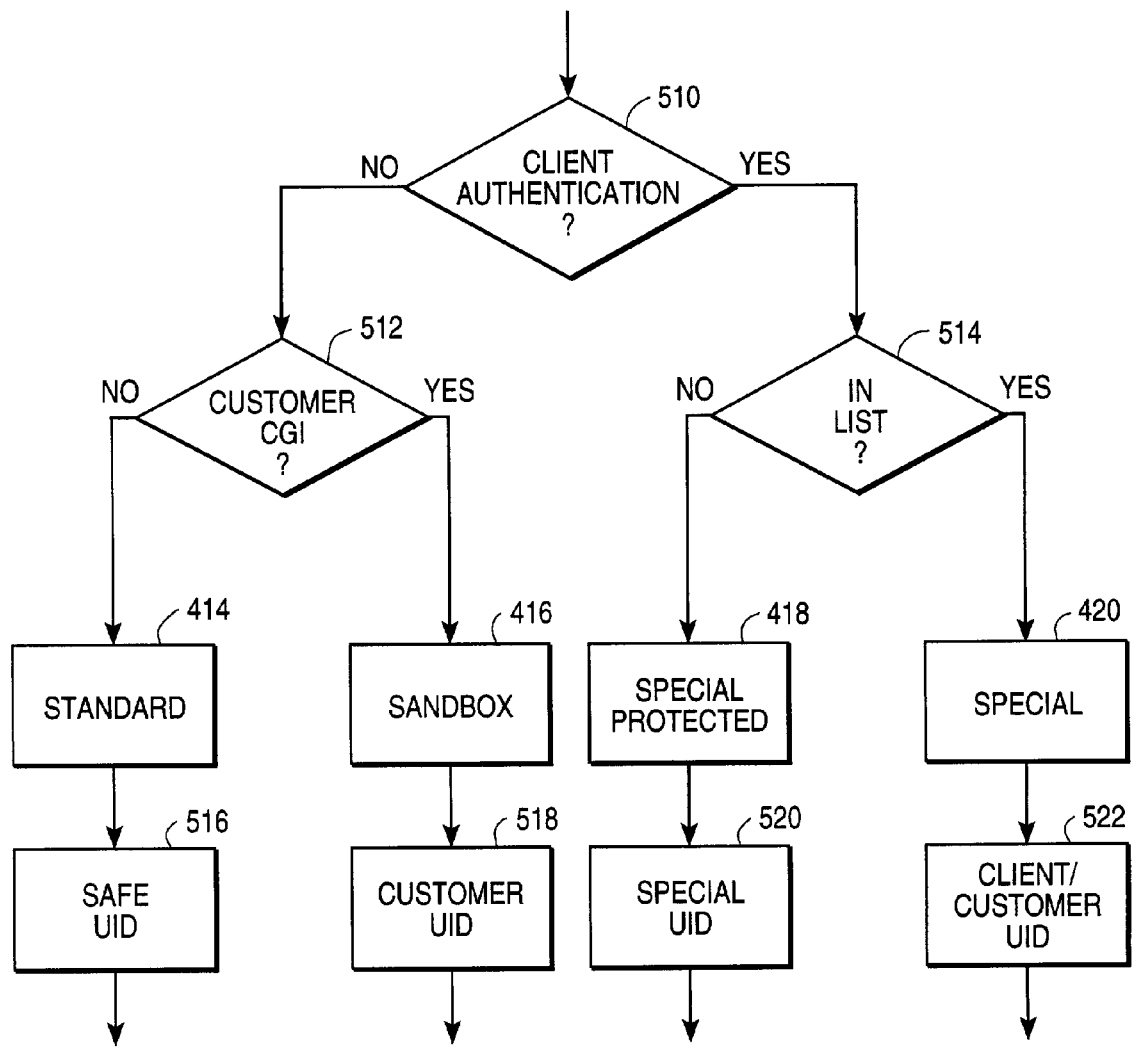
FIG_5

WEB HOST PROVIDING FOR SECURE EXECUTION OF CGI PROGRAMS AND METHOD OF DOING THE SAME

BACKGROUND

1. Field of Invention

This invention pertains in general to computer networks and in particular to a server for securely executing common gateway interface programs.

2. Background of the Invention

An Internet Service Provider ("ISP") may host web pages for many different customers. For example, a typical ISP may provide web hosting services for thousands of customers. These services primarily include providing storage space for web pages and CGI programs, processing time for responding to access requests and executing programs called by the web pages, and network bandwidth for sending data to and receiving data from client browsers.

The customers' web pages often refer to Common Gateway Interface ("CGI") programs (also referred to as "CGI scripts"). A common use of a CGI program is to provide data in response to a client request for information through back-end processing. For example, a CGI program may provide flight status information, a directory listing, or driving instructions in response to a web page-based query.

CGI programs may be written in any language understandable to the executing server, including, for example, C, Perl, or a shell script. CGI programs usually reside in a "/cgi-bin/" directory on the web server or logically connected to the web server. When a link to a CGI program on a web page is selected, the web server executes the CGI program, passes along information from the web page, and transmits the outputted information back to the client browser.

On a server running a variant of the UNIX operating system, each process executed by the server has an associated user identification ("UID"). The UID identifies the user who executed the process, and is used to determine the permissions available to that user. In a typical web hosting environment, CGI programs executed by the web server have a UID identifying the web server. This situation is undesirable because it grants any CGI program all of the permissions and associated capabilities available to the web server. Therefore, a malicious user could write a CGI program that abuses its permissions and harms the web server.

To avoid this potential security breach, certain web servers have the capability of executing the CGI program using a different UID. For example, the Apache HTTP Server Version 1.3 includes the suEXEC feature, which provides Apache users with the ability to run CGI programs under UIDs different from the UID of the calling web server. Thus, the web server can be configured to execute the CGI program with the owning customer's UID or with a special "safe" UID.

However, the suEXEC feature does not provide a security model robust enough for sophisticated web hosting needs. A web host, for example, may provide a remote access feature wherein the customer uses CGI programs to update files on the web server. In such a case, the web server must authenticate that the client is the customer before executing the CGI. Otherwise, non-customers would be able to execute CGI programs and overwrite the customer's data. Likewise, it is sometimes desirable to allow an authenticated customer to write data that even the customer cannot later alter.

Accordingly, there is a need for a more sophisticated security model for web servers. Preferably, this security model would work with existing web servers and without requiring major upgrades of hardware or software.

SUMMARY OF THE INVENTION

The present invention provides a method and system for implementing a web host that executes common gateway interface ("CGI") programs in one of four security modes, thereby allowing greater customization of the privileges available to the program. A system according to the present invention includes a web host having a web server, a CGI proxy, and a CGI storage. A client, usually located at a remote computer terminal, accesses web pages stored in the web server by communicating with the web server using the hypertext transport protocol ("HTTP"). The client may request that the web server execute a target CGI program stored in the CGI storage by sending a web page-based form to the web server. The form identifies the path to the CGI program and includes a query string with information for processing by the CGI program.

A redirector within the web server receives CGI program execution requests generated by clients and rewrites the CGI request to call a CGI proxy. In addition, the redirector reformulates the query string received with the CGI execution request and passes it as a parameter to the CGI proxy.

The CGI proxy parses the query string and uses it to determine an execution mode for the target CGI program. If the query string contains authentication information allowing the CGI proxy to authenticate the identity of the client, the CGI proxy performs this authentication. If not, the CGI proxy determines from the path of the target CGI whether the target CGI is belongs to a customer of the web host.

If the client is not authenticated and the target CGI program does not belong to a customer, the CGI program is executed using a "safe" user identification ("UID"). The safe UID is preferably an identification that has only limited reading and writing privileges on the web host. Accordingly, the potential for dangerous use of the CGI program is reduced.

If the client is not authenticated but the target CGI program belongs to a customer, the CGI program is executed using the customer's UID. Using the customer's UID in this manner allows the privileges of different CGI programs to be compartmentalized. Thus, one customer's CGI programs will have, at most, read and write access to only the files accessible to that customer.

If the client is authenticated, the CGI proxy determines whether the target CGI program is in a list of special CGI's typically maintained by the web host operator. If so, the CGI program is executed using the customer's UID. This mode is typically used by the customer to execute CGI programs installed by the web host operator to maintain the customer's web pages. The authentication allows the web host operator and the customer to ensure that only the customer has access to these CGIs and the compartmentalization accorded by using the customer's UID prohibits a customer from altering another customer's files.

If the client is authenticated and the target CGI is not in the list of special CGIs, the CGI program is executed using a special UID having greater write permissions that typically granted to a customer. This mode is generally used to execute programs for writing files that belong to the user, yet the user does not have permission to modify.

Before executing the CGI program, the CGI proxy deletes unnecessary information from the query string by returning the string to its state before the execution request was intercepted by the redirector. Then, the CGI program is executed using the determined security mode and the query string. A CGI program expecting to be executed only after successful authentication preferably first checks its UID. If the program is not executed with its expected UID, it halts execution and returns a result indicating that execution aborted. This result, along with any other information generated by the CGI program, is returned by the CGI proxy to the web server, which, in turn, provides the information to the client.

A method for securely executing programs on a web host according to an embodiment of the present invention includes the steps of providing a plurality of web pages to a client; receiving from the client a request to execute a program stored on the web host; authenticating the client if possible; determining an execution mode for the program; and executing the program in the determined execution mode.

Computer program instructions encoded on a computer-readable memory for securely executing programs on the web host include instructions for: receiving a program execution request from a client; redirecting the execution request to a proxy; determining an execution mode for the program; and executing the program in the determined execution mode.

BRIEF DESCRIPTION OF THE DRAWINGS

FIG. 1 is a high-level block diagram of a client computer and a web host according to a preferred embodiment of the present invention;

FIG. 2 is a high-level block diagram of a computer system for implementing the web host according to one embodiment of the present invention;

FIG. 3 is a flowchart illustrating steps for intercepting a CGI execution request according to one embodiment of the present invention;

FIG. 4 is a flowchart illustrating steps for executing a CGI proxy according to one embodiment of the present invention; and FIG. 5 is a flowchart illustrating steps for determining the execution mode of a CGI program according to one embodiment of the present invention.

DETAILED DESCRIPTION OF THE PREFERRED EMBODIMENT

As used herein, the "Internet" refers to the global network of interconnected computer systems and the "World Wide Web" ("WWW") refers to the global hypertext system using the Internet as its transport mechanism. A "web server" is a program that accepts requests for information framed according to the HyperText Transport Protocol ("HTTP"). "Web pages" are the information supplied by the web server in response to the requests. The Common Gateway Interface ("CGI") is the standard that describes how the web server accesses external programs, usually called "CGI programs" or "CGI scripts," called by a web page. The "query string" is the string of command line parameters passed to the CGI program upon invocation. A "web host" is the computer system or systems on which the web server and CGI programs execute and provides web serving capabilities to a plurality of customers. A "customer" is the entity storing web pages on the web server. A "client" is a person or computer system accessing the web server, typically by using browser software.

FIG. 1 is a high-level block diagram of a client computer 110 and a web host 112 according to a preferred embodiment of the present invention. The client computer 110 is a typical personal computer having, among other things, a processor, memory, storage device, and monitor. The client computer 110 is coupled to the web host 112 via a network connection 114. The network connection may be, for example, a modem coupled to an analog telephone line, a digital subscriber line, a cable modem utilizing bandwidth on a cable television coaxial cable, or any other communications medium. In addition, data sent from the client computer 110 to the web host 112 may pass through one or more other computers coupled to the Internet before reaching the web host 112. Web browsing software, such as NETSCAPE NAVIGATOR®, preferably executes on the client computer and sends data from the client computer 110 to the web host 112 via the network connection 114. The web browsing software also displays data received from the web host 112 on the client computer 110.

FIG. 2 is a high-level block diagram of a computer system 200 for implementing the web host 112 according to one embodiment of the present invention. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The at least one processor 202 may be any general-purpose processor such as an INTEL® x86 compatible central processing unit ("CPU"). The permanent storage device 208 may be any device capable of holding large amounts of data, like a hard drive, compact disk read-only memory ("CD-ROM"), digital versatile disk ("DVD"), or some form of removable storage device. The memory 206 holds instructions and data used by the processor 202. The pointing device 214 may be a mouse, track ball, light pen, touchsensitive display, or other type of pointing device and is used in combination with the keyboard 210 to input data into the computer system 200. The graphics adapter 212 can display images and other information on the display 218. The network adapter 216 couples the computer system 200 to the Internet 114 or other local or wide area network.

A program for web serving according to one embodiment of the present invention is preferably stored on the storage device 208, loaded into the memory 206, and executed on the processor 202. A preferred embodiment of the present invention executes the UNIX-derived SOLARIS 2.5 operating system coupled with the NETSCAPE ENTERPRISE SERVER to support the web hosting functionality described herein. Alternatively, hardware or software modules may be stored within the computer system 200 for performing the method steps described herein.

The web host 112 includes a web server 116, a CGI proxy 118, and a CGI storage 120. Although these devices are illustrated as separate units, the devices are preferably implemented as software and hardware components executing within the computer system 200 of FIG. 2.

As mentioned above, the web server 116 is preferably the NETSCAPE ENTERPRISE SERVER. Customers preferably install web pages 117 on the web server 116 that provide information to requesting clients 110. The web server 116 receives the client requests, finds the target customer web page, and delivers the web page to the client 110.

A client 110 can input information to the web server 116 by filling out a form on the web page and then transmitting the form to the web server 116. The web server 116 then calls a CGI program to process the information on the form and generate a response. A CGI program can be written in any practical programming language, including C, Perl, a shell script or batch file, or Visual Basic and may call other programs as necessary. In a preferred embodiment of the present invention, each customer preferably has a "cgi-local" directory 120 in the directory tree beneath the customer's login directory for storing CGI programs. Thus, each customer stores its CGI programs in a separate cgi-local directory having the path <web server root>/<customer login>/cgi-local/<path of CGI program>/<name of program>.

In a preferred embodiment of the present invention, all web page calls to CGI programs are intercepted by a redirector 122 that redirects the calls to the CGI proxy 118. In one embodiment, the redirector 122 is a NETSCAPE ENTERPRISE SERVER plug-in using the NETSCAPE ENTERPRISE SERVER applications programming interface ("NSAPI"). As understood in the art, a "plug-in" is an executable program that interacts with the web server and thereby supplements or replaces functionality of the web server 116.

In a preferred embodiment, the redirector 122 is implemented by defining, for web objects of type CGI, a new NSAPI Service function entitled "secure_send_cgi", which replaces the standard Netscape Service function for CGI programs, "send_cgi". The new "secure_send_cgi" function is compiled into a UNIX shared library, which is loaded into the Netscape Enterprise Server using loading directives in the server's configuration file.

FIG. 3 is a flowchart illustrating steps for intercepting and redirecting a CGI execution request according to one embodiment of the present invention. Upon receiving the CGI execution request, the redirector 122 determines 310 the path of the target CGI program, preferably by using the NSAPI "pblock_findval" call to locate the target path. Next, the redirector 122 rewrites 312 the CGI execution request to target the CGI proxy 118 instead of the identified CGI program. The rewriting 312 is preferably performed by using the NSAPI "pblock_remove" call to remove the original target path from the request and the "pblock_nvinsert" call to substitute into the request the path to the CGI proxy 118.

In addition, the redirector 122 formulates 314 a query string for the CGI proxy 118 invocation by appending the path of the target CGI program and the query string with which the CGI was originally invoked to the query string for the CGI proxy 118. This step 314 is preferably performed by using the NSAPI "pblock_findval" call to locate the original query string and then appending a new variable, "_SSC_TARGET", having the value of the originally requested target path, to a copy of the original query string, thereby constructing a new query string. Next, the redirector 122 preferably uses the NSAPI "pblock_remove" and "pblock_nvinsert" calls to substitute the newly constructed version of the query string in the request for the original query string.

At the least, the substituted CGI proxy 118 invocation query string contains the target path of the CGI program. Depending on how the CGI program was called by the client, the original CGI execution request received by the redirector 122 may also include the client's user name and password and any additional information that would have been passed to the CGI program. Next, the redirector 122 preferably uses the NSAPI "pblock_remove" call to remove from the request the function name, which is set to "secure_send_cgi" since this function was specified as the web server's 116 Service function for CGI requests. Then, the redirector 122 preferably uses the NSAPI "pblock_nvinsert" call to insert into the request the function name "send—cgi", which is the normal Service function for CGI requests.

The CGI proxy 118 is then invoked 316 with the formulated query string. The redirector 122 preferably uses the NSAPI "func_exec" call to invoke the currently requested function, "send—cgi", which in turn invokes the currently requested CGI program. This program was set to the CGI proxy 118 at step 312. Thus, the redirector 122, intercepts incoming requests and transparently redirects the requests to the CGI proxy 118 with the appropriate environment and using the standard CGI invocation mechanism.

In one embodiment, the CGI proxy 118 is a modified setuid program executing on the web server 116 as a root user. The CGI proxy 118 maintains a list 124 of previously designated "special" CGIs that allow the customer to perform web page maintenance and other utilities as described below.

FIG. 4 is a flowchart illustrating steps for executing the CGI proxy 118 according to one embodiment of the present invention. First, the CGI proxy 118 parses 410 the query string received from the redirector. The CGI proxy 118 then determines 412 the execution mode for the target CGI program. There are four possible execution modes: standard 414, sandbox 416, special 418, and special protected 420.

FIG. 5 is a flowchart illustrating steps for determining the execution mode of the CGI program according to one embodiment of the present invention. The CGI proxy 118 attempts 510 to authenticate the client 110. If the query string received from the client contains authentication information, the CGI proxy 118 uses it to authenticate 510 the client. Authentication is preferably performed using standard authentication techniques, such as comparing a user name and password received in the query string with an encrypted user name/password pair stored in the web host 116. Alternatively, authentication can be based on the address of the client or other ascertainable information about the client. Authentication fails if the query string lacks authentication information or the provided information does not authenticate, like when the user name and password do not match.

If authentication is not needed, the CGI proxy 118 determines 512 whether the target CGI program is owned by a customer of the web host 112. The CGI proxy 118 preferably makes this determination by determining whether the path of the target string matches the <web server root>/<customer login>/cgi-local/<path of CGI program> path of customer CGI programs. If the target CGI program is not owned by a customer of the web host 112, then the target CGI program is executed in standard mode 414. In standard mode, the CGI proxy 118 switches 516 to a predetermined safe UID before executing the CGI program. The safe UID has only limited privileges and is used to restrict possible damage that might be caused by the targeted CGI program. This mode is typically used to execute a program returning an error message like "Authentication Failed" to the user.

If the target CGI program is owned by a customer of the web host 112, then the target CGI program is executed in sandbox mode 416. In sandbox mode, the CGI proxy 118 switches 518 to the UID of the customer owning the CGI program. The CGI proxy 118 identifies the customer's UID by extracting the customer's user name from the CGI program path in the query string. This mode is used to compartmentalize CGI programs from different customers, thereby providing a level of security to the web server 116 and the customer.

If the client was successfully authenticated 510, then the CGI proxy 118 determines 514 whether the target CGI program is in the list of special CGI programs 124 installed on the web host 112 for purposes including, for example, modifying guest books, publishing web pages, and updating hit counters. If the target CGI program is in the list, the CGI program is executed in special mode 420. In special mode, the CGI proxy 118 switches 522 to the client/customer UID as determined from the query string, thereby giving the CGI program full read/write access to the customer's files in the web server 116.

If the target CGI program is not in the list 124, the CGI program is executed in special, protected mode 418. In special, protected mode, the CGI proxy 118 switches 520 to a predetermined special UID having permission to write files that the customer cannot write. Special, protected mode is used for CGI programs that execute on behalf of customers against protected data. In general, CGI programs executing in special, protected mode generate files that the user can execute and delete, but cannot modify.

In alternative embodiments, the steps illustrated in FIG. 5 may be performed in different orders. For example, in one embodiment, the CGI proxy 118 first determines whether the target CGI program is owned by a customer of the web host 112. Assuming most CGI program execution requests are for customer programs, the CGI proxy 118 can save processor cycles by not testing for authentication information unless authentication is needed.

Returning to FIG. 4, after the mode switch is made, the CGI proxy 118 deletes 422 unneeded information from the query string, such as the path of the target CGI program inserted into the query string as the __SSC__TARGET variable at step 314 and, perhaps, the authentication information. Thus, the query string is returned to as it was when the CGI program was initially invoked by the client. Cleaning out the query string in this manner enhances system security by obscuring the operation of the CGI proxy 118.

Then, the CGI program is executed 424 with the query string in the selected execution mode. Once execution is complete, the CGI program preferably returns a result indicating whether execution was successful. CGI programs that expect to execute in a particular mode preferably check their UID at the beginning of execution. If the CGI programs are not in the proper mode when executed, the programs halt and return a result indicating that execution failed.

The result generated by the CGI program is received by the CGI proxy 118 and returned 426 to the redirector 122. Returning to FIG. 3, the redirector 122 then restores 318 the execution request to its state before execution was redirected. This restoration 318 is preferably performed by deallocating any temporary memory storage, using the NSAPI "pblock_remove" call to remove from the request the target path to the CGI proxy 118, using the "pblock_nvinsert" call to insert back into the request the original target path, using the "plock_remove" call to remove from the request the modified query string, and using the "pblock_nvinsert" call to insert back into the request the original query string. Then, the redirector 122 exits and returns 320 to the calling web server 116 the value returned by the NSAPI "send_cgi" call via the "func_exec" call. Accordingly, the redirector 122 returns the status of the CGI invocation in the same manner as if the invocation had not been redirected.

In sum, the present invention provides a robust security model for executing customer CGI programs on a web server. By using a redirector that redirects CGI invocations to a CGI proxy, the present invention can enter one of four security modes before executing the CGI program. In addition, the present invention can authenticate the client before allowing the program to execute.

We claim:

1. A method of securely executing programs on a web host providing a plurality of web pages to a client and having a processor and a memory, the method comprising the steps of:

receiving from the client in response to a particular web page a request to execute a program in the memory of the web host identified by a path;

if the request from the client includes authentication information, authenticating an identity of the client;

determining an execution mode for the program from the path of the program, data stored in the memory specifying programs requiring a certain execution modes, and a result of the authentication; and executing the requested program with the processor in the determined execution mode.

2. The method of claim 1, wherein the determining step comprises the steps of:

determining from the path whether the requested program is associated with a customer having programs stored on the web host, wherein the path points to a location on the web host.

3. The method of claim 1, wherein the determining step comprises the steps of:

determining from the path whether the requested program is associated with a customer having programs stored on the web host; and responsive to a negative authentication of the client and a positive determination that the program is associated with a customer, setting the execution mode to a user identification of the customer.

4. The method of claim 3, wherein, in response to a negative authentication of the client and a negative determination that the program is associated with the customer, the determining step comprises the step of:

setting the execution mode to a predetermined safe mode having fewer execution privileges than the user identification of the customer execution mode.

5. The method of claim 1, wherein, in response to a positive authentication of the identity of the client, the determining step comprises the step of:

determining, from the path, whether the program is in a list specifying execution modes for particular programs.

6. The method of claim 5, wherein, in response to a positive determination that the program is in the list, the executing step comprises the step of:

setting the execution mode to a user identification of the client.

7. A host for providing data to and receiving data from a client in communication with the host, the host comprising:

a program storage for holding a plurality of programs, each program identified by a path;

a server coupled to the program storage and in communication with the client, for receiving a request from the client containing a path identifying a program in the program storage to be executed;

a security module for controlling permissions available to the identified program when executed in response to the client request, comprising:

an authentication module for authenticating the client if the request from the client contains authentication information;

a customer program recognition module for determining, from the program path identified in the client request, whether the identified program is associated with a customer of the host; and a permissions module for setting the permissions available to the identified program in response to the determinations of the authentication and customer program recognition modules; and an execution module for executing the identified program with the permissions determined by the security module;

wherein the execution module executes the identified program with a customer user identification if the authentication module does not authenticate the client and the customer program recognition module determines that the requested program is a customer program.

8. The host of claim 7, wherein the permissions module comprises:

a module for setting the permissions to a first security level if the authentication module does not authenticate the client and the customer program recognition module determines that the requested program is not a customer program; and a module for setting the permissions to a second security level if the authentication module does not authenticate the client and the customer program recognition module determines that the requested program is a customer program, wherein the second security level gives more privileges than the first security level.

9. The host of claim 8, wherein the security module further comprises:

a special module for determining, from information stored in the host, whether the program requires special security;

wherein the permissions module sets the permissions available to the program in response to the determination of the special module.

10. The host of claim 9, wherein the permissions module further comprises:

a module for setting the permissions to a third security level if the special module determines that the program requires special security and the authentication module authenticates the client; and a module for setting the permissions to a fourth security level if the special module determines that the program does not require special security and the authentication module authenticates the client.

11. The host of claim 9, wherein the execution module executes the identified program with the customer user identification when the permissions are set to the third security level.

12. The host of claim 9, wherein the execution module executes the identified program with a special user identification when the permissions are set to the fourth security level.

13. The host of claim 8, wherein the execution module executes the identified program with a predetermined safe user identification when the permissions are set to the first security level.

14. The host of claim 8, wherein the execution module executes the identified program with the customer user identification when the permissions are set to the second security level.

15. A computer-readable memory having a computer program instructions encoded thereon for securely executing programs on a web host having a processor and a memory, the computer program instructions comprising:

instructions for receiving a program execution request from a client in communication with the web host, the program execution request identifying a path of a program stored in the memory;

instructions for redirecting the program execution request to a proxy executing on the processor and providing the proxy with the path of the program stored in the memory;

instructions for determining an execution mode for the program identified by the path from the path; and instructions for executing the program identified by the path on the processor with the determined execution mode.

16. The computer-readable memory of claim 15, wherein the computer program instructions for determining the execution mode comprise:

instructions for determining from the path of the program stored in the memory whether the program is associated with a customer of the web host, wherein the path points to a location on the web host.

17. The computer-readable memory of claim 15, wherein the computer program instructions further comprise:

instructions for determining from the path whether the program is associated with a customer of the web host; and instructions for executing the program identified by the path with a safe user identification in response to a negative authentication of the client and a determination that the program is not associated with a customer of the web host.

18. The computer-readable memory of claim 17, wherein the computer program instructions for executing the program comprise:

instructions for executing the program identified by the path with the user identification of the customer associated with the program in response to a negative authentication of the client and a determination that the program is associated with a customer of the web host, wherein the program executed with the user identification of the customer has more privileges than the program executed with the safe user identification.

19. The computer-readable memory of claim 15, wherein the computer program instructions for determining the execution mode further comprise:

instructions for authenticating the client using data received with the program execution request.

20. The computer-readable memory of claim 19, wherein the computer program instructions for executing the program comprise:

instructions for executing the program identified by the path with a user identification of the client in response to a positive authentication of the client.

21. The computer-readable memory of claim 19, wherein the computer program instructions for determining the execution mode further comprise:

instructions for determining from the path of the program stored in the memory whether the program is in a list of programs requiring particular execution modes in response to a positive authentication of the client.

22. The computer-readable memory of claim 21, wherein the computer program instructions for executing the program comprise:

instruction for executing the program identified by the path with a user identification of the client in response to a determination that the program is in the list of programs requiring particular execution modes.

23. The computer-readable memory of claim 19, wherein the computer program instructions for executing the program comprise:

instructions for executing the program identified by the path with a safe user identification in response to a negative authentication of the client.

* * * * *